INVENTOR.
GERALD W. SOVEREIGN
BY Stanley M. Tarter
ATTORNEY

Nov. 16, 1965 G. W. SOVEREIGN 3,218,297
CONTINUOUS PROCESS FOR THE POLYMERIZATION OF AQUEOUS SOLUTIONS
OF HEXAMETHYLENE AMMONIUM ADIPATE USING FRUSTO-CONICAL
ANNULAR FILMS OF SAME
Filed July 1, 1960 2 Sheets-Sheet 2

INVENTOR.
GERALD W. SOVEREIGN
BY
Stanley M Tarter
ATTORNEY 3,218,297
CONTINUOUS PROCESS FOR THE POLYMERIZA-
TION OF AQUEOUS SOLUTIONS OF HEXA-
METHYLENE AMMONIUM ADIPATE USING
FRUSTO-CONICAL ANNULAR FILMS OF SAME
Gerald W. Sovereign, Gulf Breeze, Fla., assignor, by
mesne assignments, to Monsanto Company, a corpora-
tion of Delaware
Filed July 1, 1960, Ser. No. 40,451
1 Claim. (Cl. 260—78)

This invention relates to a process for the preparation of high molecular weight synthetic linear polymers, especially to those prepared by condensation type reactions, such as polyamides, polyesters, and the like. More particularly this invention relates to a process for the continuous preparation of linear polycarbonamides of a type characterized by a high molecular weight including those particularly useful in the formation of shaped articles such as filaments, fibers, and the like.

The production of linear condensation polymers from polymer-forming reactants has assumed increasing commercial importance throughout various industries. In the formation of such linear polymers particularly those of the type having properties which include film and fiber-forming properties, the polymeric end product may be a polycarbonamide which is formed from liquid compositions comprising polycarbonamide-forming reactants.

In one example of the formation of polycarbonamides such as the nylons and the like, an aqueous solution of a polycarbonamide-forming composition is subjected to evaporating conditions and then to superatmospheric pressures and polyamide-forming temperatures to carry out the polycondensation or polyamide forming reaction. As the polycondensation of such polyamide-forming compositions progresses, the viscosity of the polyamide reaction mass increases; and it has been found that with the use of heretofore known apparatus portions of this viscous reaction mass tend to remain in a relatively stagnant or physically inert condition particularly in the latter stages of the polycondensation process wherein the mass is ordinarily subjected to an enervating climate. This polycondensation climate together with the increasing viscosity of the mass tends to inhibit the efficient performance of the polycondensation process in that the poly-joining of the amine ends with the carboxyl ends is greatly impeded and in that considerable difficulty is experienced in removing the water of reaction from the reaction mass. As a result of the inclination of the water of reaction to remain engaged in the mass, there is a tendency of the polycondensation process to reverse or not to proceed to its normal completion, thereby producing a polyamide product of inferior quality.

Further difficulties have been encountered in the use of present day polycondensation apparatus not only as a result of the enervating climate inherently induced by the use of the known apparatus and to which the reaction mass is subjected but, also as a result of inferior heat transfer conditions common to such apparatus both during evaporation and polycondensation. Because of these drawbacks, it has been found that the reaction mass must be maintained at a high temperature for undesirably long periods of time in order to insure evaporation of volatile products and a favorable completion of the polycondensation reaction. As is well known, maintaining polymer-forming compositions such as those described above at a high temperature for a relatively long period produces thermal degradation or degeneration of the resultant polymer. In addition, as the polymerization process nears completion and the viscosity of the reaction mass approaches its desired optimum value, the heat applied to the mass creates an excess of polymerization in portions and/or undesirable side reactions with the result that clusters of obnoxious materials commonly referred to as "gels" are formed. Although the chemical composition of these "gels" is not precisely understood, it is known that these "gels" are objectionable and cause substantial reduction of the quality of the polymeric end product. Various structures have been proposed to maintain the reaction mass in a turbulent state and promote heat transfer conditions during the last stage of polymerization, all of which have failed to overcome this gelation problem. Furthermore thermal degradation of the polymer is still encountered.

A low surface-to-volume ratio between the materials undergoing polycondensation and the ambient gas tends to limit the elimination of water or the like product of reaction from the liquid phase to the gas phase. As indicated above the disengagement of water from the reaction mass is of critical importance in the successful carrying out of certain polycondensation processes. It is, therefore, highly desirable that a high surface-to-volume ratio be obtained in order to promote the elimination of water or like material resulting from the union of the molecule undergoing polycondensation and to increase the efficiency of carrying out of the polycondensation process. Furthermore, a low surface-to-volume ratio reduces the rate at which the water of solution in the mass is evaporated, adding a further limitation to the effective carrying out of a solution-type polycondensation process.

It is, therefore, a primary object of this invention to provide a new and novel process for the manufacture of synthetic polymers.

Another object of this invention is to provide a new and novel process for making high quality synthetic linear polycondensation polymers such as polycarbonamides and particularly those having film- and fiber-forming properties.

Still another object of this invention is to provide a new and novel process for preparing synthetic linear polycondensation polymers which can be performed in a minimum of time and thus reduce or substantially eliminate thermal degradation and gelatinous formations in the polymer-forming reaction masses.

A further object of this invention is to provide a new and novel polymerization process for preparing synthetic linear polymers in which the polymerization process can be carried out in a rapid and efficient manner, which utilizes a minimum of equipment, and which gives a polymeric end product substantially free of objectionable material such as "gels" and the like.

This invention further contemplates the provision of a new and novel process for forming synthetic linear polycondensation polymers such as polyamides, the process being characterized by a high degree of turbulence or induced liveliness and a high surface-to-volume ratio in the reaction mass during the conversion of the reaction mass to high molecular weight polymers.

A still further object of this invention is to provide a new and novel process for making synthetic linear polymers which utilizes a thin-film type of means adapted to draw off volatile material in the form of a vapor such as an evaporator which may be selectively incorporated within one or more phases of a continuous polymerization process of polycarbonamides.

Other objects and advantages of the invention will become apparent from the following description taken in connection with the accompanying drawing.

The objects of the invention are accomplished by providing a polymer-forming reaction mass which, in the preferred specific embodiment, includes an aqueous solution of a diamine-dibasic carboxylic organic salt. In the novel process of the invention, the reaction mass is conducted continuously through a path in a turbulent thin-film state characterized by high surface-to-volume ratio; and heat is applied to the thin film. While in the thin-film form, the mass is subjected to elevated temperatures and pressure so as to evaporate volatile products such as water of solution and water of reaction and to accomplish progressively the polycondensation of the polymer-forming reaction mass. To put the mass in such a thin-film state, a thin-film of evaporating unit can be employed through which the reaction mass is conducted or advanced rapidly in a thin annular film and in which the film is heated during its movement through the unit.

The novel features which are believed to be characteristic of the invention are set forth with particularity in the appended claims. The invention itself, however, both as to its organization and method of operation, may be best understood by reference to the following description taken in conjunction with the accompanying drawing in which:

Figure 1:
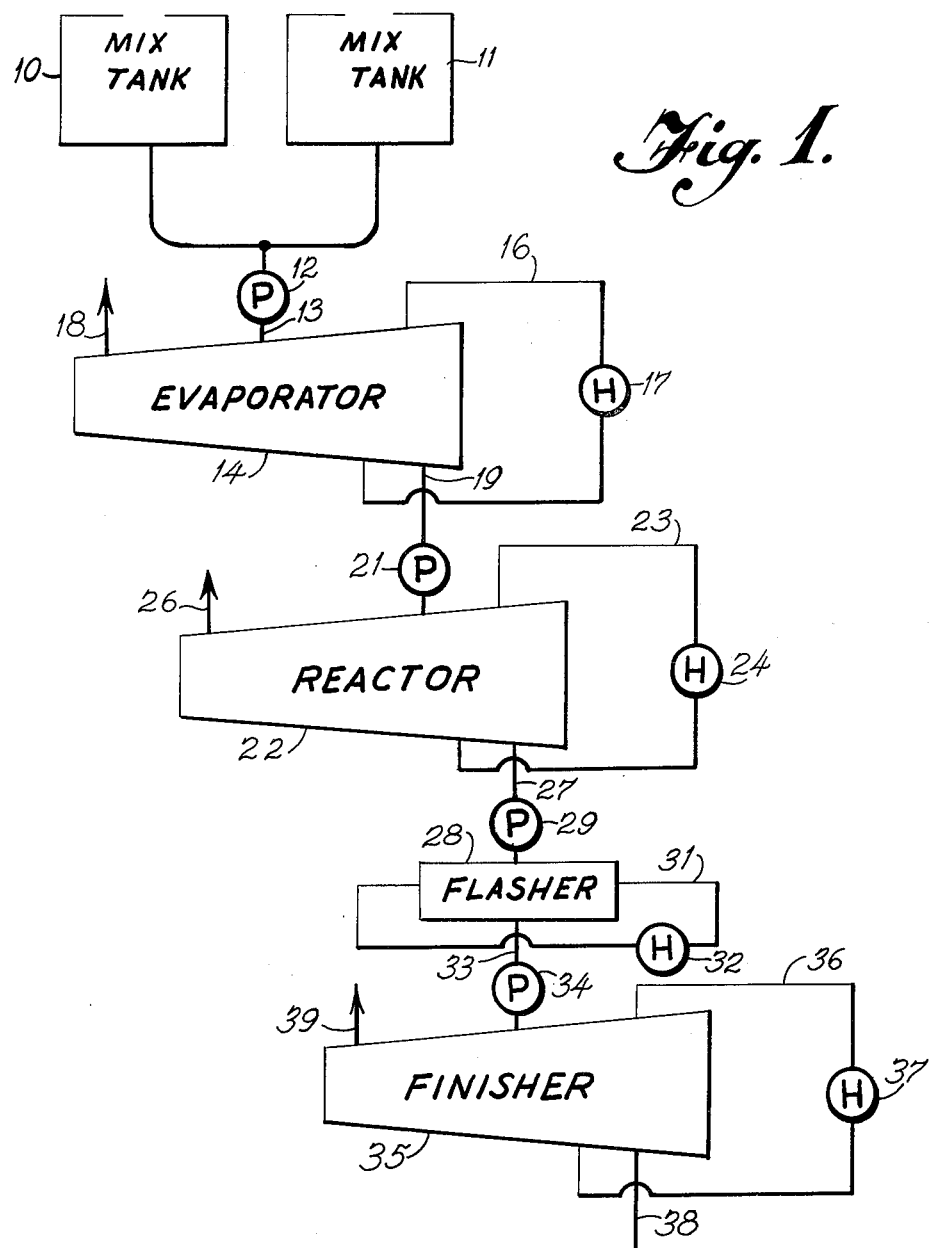
FIGURE 1 is a flow chart or diagram illustrating a polymerization process carried out in accordance with the invention.

Referring now to FIGURE 1, there is shown schematically by means of a flow chart or diagram one embodiment of the novel method for making linear polymers contemplated by the invention. The polymerization apparatus employed to conduct the process of FIGURE 1 comprises a pair of containers or mix tanks 10 and 11 in which proper proportions of the constituents which form the polymer-forming composition or reaction mass are initially placed and uniformly mixed, if desired.

Although in general any polymer-forming composition may be processed with the novel method of the invention, those materials capable of undergoing polycondensation to form polymers of high molecular weight, e.g. polymers having fiber-forming characteristics, are preferably produced. It is with reference thereto that the novel method of this invention exemplarily will be described. Polymer-forming compositions suitable for preparing fiber-forming polymers in accordance with the invention may be of the type from which polycarbonamides are prepared and it is for the preparation of polycarbonamides which includes the commercially produced nylons that the description of the invention will be directed hereinafter. As an example, the reaction mass within the mix tanks 10 and 11 may comprise a mixture of an organic primary or secondary diamine and an organic dibasic carboxylic acid, a salt thereof or a polymerizable monoamino organic acid. It should be understood that the method of the invention may be more advantageously practiced by initially providing the polyamide-forming composition in aqueous solution form. For instance, 40 to 50% aqueous solution of the polyamide-forming salt, hexamethylene ammonium adipate, may be provided.

By means such as a pump 12 positioned within a feed line 13, the solution of polyamide-forming salt or reaction mass is conveyed to an evaporating device 14 commonly referred to as a "thin-film" evaporating unit through which the mass is moved continuously in the form of a thin film. Such a thin-film evaporating unit is readily available commercially and will be described in detail hereinafter. Preferably, this evaporating unit is an Adjusto-Film unit manufactured by the Kontro Company of Petersham, Massachusetts, which is shown in more detail in FIGURES 2 and 3. In such a thin-film evaporating unit, the reaction mass is moved through a path in a turbulent thin annular film characterized by a high surface-to-volume ratio; and heat is supplied to the reaction mass by means of any suitable heating medium such as "Dowtherm," steam, or the like. The heating medium can be moved continuously through the unit 14 by means of a fluid circuit 16 and can be continuously heated by any suitable circuit heating means designated generally by the numeral 17.

In the initial stages of such a polymer-forming process, the aqueous solution of the polyamide-forming salt is heated sufficiently in the thin-film evaporating unit 14 to evaporate some of the water of solution from the reaction mass. For example, the salt solution may be heated to a temperature of approximately 105–115° C. at suitable pressures to bring about this and to increase the amount of salt in solution to 60–75% or higher. Ordinarily the salt is not increased to the concentration at which crystallization of the salt occurs at the temperature employed. In the preferred construction, the evaporated water of solution or vapor may be removed from the unit 14 through an outlet 18. It should be understood that a limited amount of oligomerization of the mass may take place in the evaporator, although this is not the usual case.

The reaction mass processed in the evaporator 14 is subsequently removed therefrom through a feed line 19 by means such as a pump 21 and is conducted through a second evaporating unit or reactor 22 in a thin-film turbulent path characterized by a high surface-to-volume ratio such as in the evaporating unit 14. In the illustrated embodiment, the reactor 22 is preferably substantially identical to the evaporating unit 14 and can be, therefore, of the thin-film producing type so as to permit the reaction mass to move continuously therethrough in a rapid manner while heat is applied to the mass.

In order to induce polycondensation of the salt of adipic acid and hexamethylene diamine, the reaction mass in its thin-film state is pressurized within the reactor 22 to a pressure of approximately 240–260 pounds per square inch gauge, and is heated to an elevated polyamide-forming temperature which may be approximately 225 to 260° C. by means of a heating medium flowing within a heating circuit 23 as in the manner of unit 14. Similarly, a heater 24 for heating the fluid is also provided within the fluid heat transfer circuit 23.

At the superatmospheric pressure and the polyamide-forming temperature existing within the reactor 22, a large percentage of the reaction mass moving continuously therethrough is polycondensed and converted to a low molecular weight polyamide. The volatile products including the water of reaction produced in the reactor 22 during polycondensation may be removed through a reactor outlet conduit 26.

At the completion of the polymer conversion step in reactor 22, the partially polymerized mass is subsequently removed from the reactor through line 27 and is conveyed to a pressure reduction unit or flasher 28 by means such as a pump 29. The pressure on the partially polymerized reaction mass within the flasher 28 is quickly dropped to substantially atmospheric pressure; and engaged water within the mass is evaporated or flashed from the mass thereby resulting in an increase in the degree of polymerization of the mass. At the same time a predetermined amount of heat is preferably supplied to the mass to replace the heat lost during the flashing operation. This heat may be supplied by means of a suitable heating medium flowing within a heating circuit 31 which is provided with a heater 32.

The substantially polymerized reaction mass is now conducted through line 33 by means such as a pump 34, to a third evaporating unit or "finisher" 35 preferably substantially identical to evaporating units 14 and 22, and is moved therethrough in an annular path in a turbulent thin-film state characterized by a high surface-to-volume ratio in the manner described above. Heat is supplied to the thin-film reaction mass in the finisher 35 by means of a heating medium or fluid flowing within a heating circuit 36 provided with a heater 37 for fluid heating. In the finisher 35, the polycondensation process is carried substantially to completion; and the polymer is removed from the finisher through line 38. The vapors formed within the finisher 35 are removed through an outlet 39.

In the polymer finishing operation carried out in the finisher 35, the hold time for the reaction mass is considerably lower than in prior apparatus so as to aid unexpectedly in decreasing the formation of "gels," or what is termed "gelation" in the mass, and in eliminating substantially thermal degradation. The above-described reaction mass, which heretofore required a finishing operation of approximately an hour or more in length, may now be quickly carried to completion to give a polymeric end product having a high degree of uniformity and containing substantially no improperly formed chemical constituents. For instance, the reaction mass may be moved through the finisher in 5–10 minutes or less.

The use of a thin-film evaporating unit such as described above for the polymer-finishing operation has been claimed and described in the copending application of Alva C. Coggeshall, Serial No. 40,450, filed July 1, 1960, now abandoned, entitled "Process for Preparing Polymers."

It has been found that unusual and unexpected advantages in the above-described polymerization process have been obtained with the use of such a thin-film evaporating unit for the evaporator 14, reactor 22, and finisher 35. Not only is the process carried to completion in a minimum of time, but also the polymeric end product is of unusually high quality as compared to that obtainable with known polymer forming apparatus. In accordance with the novel concept of the invention, while a reduction in the thickness of the material undergoing evaporization and/or polycondensation in the unit or units serially connected will provide an improvement in processing conditions, it is considered desirable to reduce the film to a thickness below 0.1 inch in order to achieve significant improvement. Therefore, generally speaking, the film thickness should be selected from a range of between 0.005 and 0.1 inch. Preferably, the film has a thickness within the range of between 0.01 and 0.05 inch.

Figure 2:
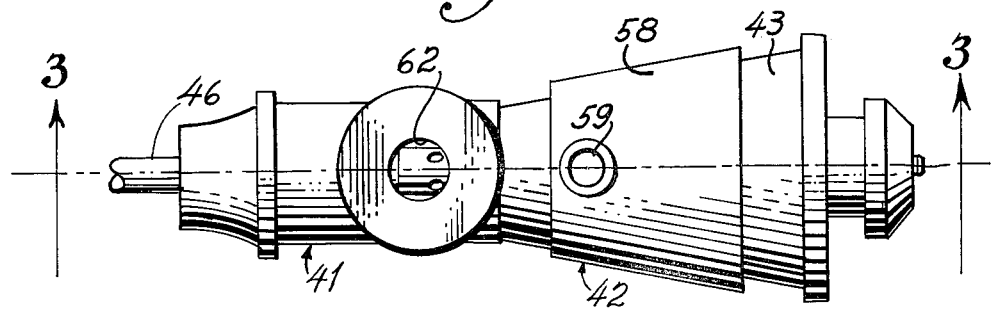
FIGURE 2 is a plan view of a thin-film type of evaporating unit which may be used in carrying out the process of the invention.
Figure 3:
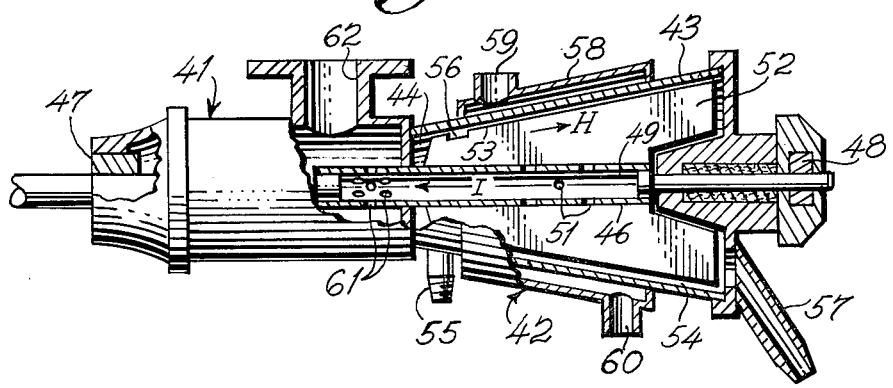
FIGURE 3 is a view partly in section taken substantially along line 3—3 of FIGURE 2 in the direction of the reference arrows.

A thin-film evaporating unit which is most suitable for the above-described polymerization process is shown in more detail in FIGURES 2 and 3. As previously explained, a type of commercially available thin-film evaporating unit may be employed and the Kontro Company Unit illustrated in FIGURES 2 and 3 has been employed to give outstanding results as contemplated herein.

Referring now to FIGURES 2 and 3, the unit which may be of any size according to the heat transfer capacity required, comprises a substantially cylindrical portion 41, and a frusto-conical portion 42 having a wall 43 defining an evaporating chamber 44. A hollow shaft 46 is positioned axially within the unit and extends centrally therethrough, being rotatably supported at each end by means such as bearings 47 and 48. The shaft 46 contains a central bore 49 and a plurality of inlet openings or ports 51 within its wall communicating with the chamber 44 as shown best in FIGURE 3. A plurality of circumferentially spaced and radially extending tapered vanes or blades 52 are suitably mounted on the outer surface of the shaft 46 so as to be rotated thereby; and each of the vanes 52 has an outer edge 53 positioned in closely spaced relationship with the inner surface of the side wall 43. The outer edges 53 of the vanes 52 define, together with the inner surface of wall 43, a radially thin, annular clearance area 54 through which the reaction mass is conveyed in a thin-film state.

The unit is also provided with an inlet 55 through which the reaction mass is conducted into the unit chamber 44. The blades 52 are notched appropriately at 56 adjacent to the inner end of inlet 55, so that proper spreading or annulation of the reaction mass is obtained initially along the inner surface of the chamber wall 43. The reaction mass in a thin annular film is therefore carried along the inner peripheral surface of the chamber wall 43 within the clearance area 54 in the direction of the arrow H as a result of the centrifugal forces developed by the rotation of the vanes or blades 52. When the continuously moving reaction mass reaches the right hand end of the unit as viewed in FIGURE 3, it will flow then through a discharge pipe or outlet 57 secured in any suitable manner to the enlarged end of the unit.

In order to transfer heat to the reaction mass moving in the form of a thin film during its journey along the inner surface of wall 43, a jacket 58 is suitably secured to the outer periphery thereof and is provided with inlet 59 and outlet 60 so that a heating medium or fluid of a well-known type, such as "Dowtherm" or the like may be continuously passed through the jacket in heat transfer relationship with the reaction mass thin film flowing through the clearance area 54.

During the processing of the reaction mass in the unit which includes the transfer of heat to the mass, the volatile products such as water and the like volatile substances which are produced during the heating of the thin-film reaction mass in the above-described manner, will flow radially inwardly through the vapor ports 51 in the wall of shaft 46 and axially along the shaft bore 49 in the direction of arrow I. A plurality of discharge wall openings 61 have been provided in the section of shaft 46 extending within the unit portion 41, through which these volatile products flow out of the shaft interior and are subsequently removed or carried away through an outlet pipe or discharge duct 62 in the unit portion 41.

As previously described, the thin-film evaporating unit of FIGURES 2 and 3, is preferably employed for the evaporator 14, reactor 22, and finisher 35, and may be of any desired capacity so as to process satisfactorily the continuously flowing reaction mass in the desired manner.

It should be understood, however, that a lesser or greater number of thin-film units may be employed within the scope of this invention, if desired, to carry out the polymerization process discussed above. For instance, it may be desirable to use one thin-film evaporating unit for both the evaporator 14 and reactor 22; or in some cases it may be possible to use a single thin-film evaporating unit to perform all of the polymerization process steps accomplished by the three units 14, 22, 35, of FIGURE 1. However, it should be understood that highly efficient processing of polymer-forming compositions and a more flexible operation are obtained when three thin-film evaporating units 14, 22, 35, are employed serially.

The following example is illustrative but not limitative of the method used in practicing the invention:

*Example*

Using thin-film evaporating units such as that disclosed in FIGURES 2 and 3, and arranged as shown in the flow sheet of FIGURE 1, a 48% solution of hexamethylene ammonium adipate is conducted from the mix tanks 10 and 11 at a flow rate of approximately 121 lbs. per hour. The adipate salt or reaction mass is then fed into the evaporator 14 having a capacity to give approximately 1 square foot of heat transfer surface and is moved in a path therethrough in a thin-film state. Heat at a rate of approximately 44,700 B.t.u.'s per hour is transferred to the thin film of reaction mass at atmospheric pressure to raise the temperature of the mass to approximately 109° C. The volatile products such as water vapor are removed from evaporator 14 at a rate of approximately 33 lbs. per hour. The dwell time for the continuously flowing mass in evaporator 14 is approximately 6–12 seconds, and the mass flows out of the unit at a rate of approximately 88 lbs. per hour at a concentration of 65%. At this point, a 2.0% slurry of titanium dioxide pigment at a temperature of 109° C. is added to the mass at a rate of 5 pounds per hour for delustering the filaments ultimately produced; and the mass is conducted into a second thin-film evaporating unit or reactor 22 having a heat transfer surface of approximately 1 square foot.

Approximately 46,600 B.t.u.'s per hour are transferred to the thin film of reaction mass in the reactor 22 to raise its temperature to about 235° C., and the pressure on the mass is increased to approximately 250 p.s.i.g. The volatile reaction products including the remaining water of solution and resulting water of reaction are carried off from reactor 22 at a rate of 34 lbs. per hour. The dwell time for the continuously flowing mass in reactor 22 is about 6–12 seconds, and the partially polymerized mass flows out of the reactor at a rate of 58 pounds per hour and at a temperature of approximately 235° C. The mass is next conducted to the flasher 28 wherein the pressure on the mass is quickly reduced to atmospheric, vaporizing engaged water from the mass. Approximately 8,000–11,000 B.t.u.'s per hour are added to the mass in the flasher to compensate for the heat loss during the flashing of water and to raise the temperature of the mass to 280° C. The flashed vapor appears in the mass as froth; and when the mass is conducted to the third evaporating unit or finisher 35, the vapor is removed at a rate of 8 lbs. per hour. The finisher 35 is provided with a heat transfer surface area of 1½ square feet, and the dwell time of the polymer in the finisher is approximately one minute. Between 0–3,000 B.t.u.'s per hour are added to the thin-film mass in the finisher 35 to retain its temperature of approximately 280° C. Polymer is discharged from the finisher at a flow rate of 50 lbs. per hour.

The conveying of the reaction mass in a thin-film state through the units 14, 22, and 35 creates a high surface-to-volume ratio as well as turbulence and gives materially improved heat transfer characteristics so that the mass is not held at an elevated temperature for any length of time causing problems such as thermal degradation of the polymer. Another advantage of the thin-film unit is the ease with which water may be disenaged from the mass. In addition water bubbles formed in the mass may readily escape from the surface of the thin-film and be carried away, aided of course by the lively condition of the thin-film. As is well known, low water content is advantageous as the polymerization reaction is an equilibrium one and proceeds further toward polymer in the first stage with less water being present. Heretofore, conventional evaporating units collected the polymer-forming composition in a large, bulky viscous mass and considerable time was required to complete the polymerization process with the attendant thermal degradation, gelation and tendency of the polymerization process to reverse due to the presence of excessive water.

With the novel arrangement described, the processing of the polymer-forming composition from start to finish may be accomplished in as short a time as approximately 5 minutes or less with a dwell time of approximately 6–12 seconds in the evaporator 14, 6–12 seconds in the reactor 22, and 30–45 seconds in the finisher 30. Previous apparatus for polymerization often required from 1–6 hours from start to finish; and the advantages of this invention are, therefore, readily apparent.

If desired, the evaporator pressure may be elevated to as much as 60 p.s.i.g. and the concentration of the solution in the evaporator may be increased to 75–90%. Therefore, increased temperatures may be utilized in the evaporator which may range in the vicinity of 125°–160° C. As previously discussed, although separate evaporator and reactor units are illustrated, it is conceivable that the two units could be combined into a single unit wherein the evaporation of both the water of solution and water of reaction may be removed sequentially.

The present process is applicable to many types of linear polymer-forming compositions and is particularly well adapted to the preparation of synthetic linear polycarbonamides which contain recurring carbonamide groups as an integral part of the main molecular chain separated by at least two carbon atoms and which include interpolyamides and interpolymers containing other groups in addition to amide groups in the main chain of atoms. Among the most useful of the polymer-forming compositions are aqueous solutions of a suitable primary or secondary oranic diamine and a suitable dicarboxylic acid or amide forming derivatives thereof, as well as salts thereof such as salts of adipic or sebacic acid with such diamines as ethylene diamine, hexamethylene diamine, decamethylene diamine. Aqueous solutions of polymerizable monoaminocarboxylic acids and their amide-forming derivatives, for example 2-pyrrolidone and 6-aminocaproic acid or its lactam, with or without addition of other polyamide-forming reactants such as diamine-dibasic acid salts, are also advantageously polymerized by the present process.

While there has been described what at present is considered to be the preferred embodiment of the invention, it will be understood by those skilled in the art that various changes and modifications may be made therein without departing from the invention; and, therefore, it is the aim of the appended claims to cover all such changes and modifications as fall within the spirit and scope of the invention.

Having thus described the invention, what is claimed is:

1. In the process for the preparation of polymeric hexamethylene ammonium adipate wherein hexamethylene ammonium adipate is dissolved in water to form an aqueous solution thereof, the resulting solution is evaporated to reduce the water content thereof, and the residue of the evaporation is then heated under pressure to convert the hexamethylene ammonium adipate into a polymer capable of undergoing further conversion to a higher molecular weight polymer, the improvement of:

(a) continuously annulating the said aqueous solution in a form of a first frusto-conical annular film of a thickness between 0.005 to 0.1 inch by being paddled along and against the inside periphery of the first annulus, (b) continuously moving said first film along the lenth of said first annulus while radially expanding said first film, (c) heating said first film during its movement therealong to reduce the water content of said aqueous solution, the water of solution being expelled radially inwardly from said film and axially removed from said first annulus, (d) continuously annulating the residue of evaporation in a form of a second frusto-conical annular film of a thickness between 0.005 to 0.1 inch by being paddled along and against the inside periphery of a second annulus, (e) continuously moving said second film along the length of said second annulus while radially expanding said second film, and (f) heating said second film during its movement therealong at a temperature about 220–260° C. and a pressure of about 240–260 p.s.i.g. to convert the said hexamethylene ammonium adipate into a polymer capable of undergoing further conversion to a higher molecular weight polymer, the water of reaction and residual water of solution being expelled radially inwardly from said second film and axially removed from said second annulus.

References Cited by the Examiner

UNITED STATES PATENTS

| | | | |
|---|---|---|---|
| 2,163,636 | 6/1939 | Spanagel | 260—78 |
| 2,165,253 | 7/1939 | Graves | 260—78 |
| 2,687,552 | 8/1954 | Gabler | 260—78 |
| 2,731,081 | 1/1956 | Mayner | 260—78 |
| 2,908,666 | 10/1959 | Notarbartolo | 260—78 |
| 2,923,699 | 2/1960 | Indest et al. | 260—78 |

FOREIGN PATENTS

| | | |
|---|---|---|
| 237,400 | 9/1945 | Switzerland. |
| 614,625 | 12/1948 | Great Britain. |
| 833,849 | 5/1960 | Great Britain. |

WILLIAM H. SHORT, *Primary Examiner.*

MILTON STERMAN, H. N. BURSTEIN, *Examiners.*